United States Patent [19]
Stephens

[11] Patent Number: 5,890,793
[45] Date of Patent: Apr. 6, 1999

[54] PORTABLE LUMINESCENT LIGHTING SYSTEM

[76] Inventor: Owen Stephens, 1891 S. Ocean Dr. No. 103, Hallandale, Fla. 33009

[21] Appl. No.: 852,901

[22] Filed: May 8, 1997

[51] Int. Cl.$^6$ ...................................................... F21S 3/12
[52] U.S. Cl. ........................... 362/225; 362/11; 362/156; 362/220; 362/238; 362/240; 362/247; 362/250; 362/410
[58] Field of Search ................................. 362/11, 16–18, 362/154, 156, 217, 220, 225, 238, 240, 241, 247, 249, 250, 410, 413, 414

[56] References Cited

U.S. PATENT DOCUMENTS

| | | | |
|---|---|---|---|
| 1,370,842 | 3/1921 | Reeves | 362/225 |
| 2,352,496 | 6/1944 | Rose | 362/225 |
| 4,658,337 | 4/1987 | Burke | 362/225 |
| 4,707,766 | 11/1987 | Bertozzi et al. | 362/11 |
| 4,737,895 | 4/1988 | Silver | 362/225 |
| 4,782,428 | 11/1988 | Lowell et al. | 362/11 |
| 5,012,396 | 4/1991 | Costa | 362/11 |

FOREIGN PATENT DOCUMENTS

| | | | |
|---|---|---|---|
| 365806 | 1/1932 | United Kingdom | 362/11 |

Primary Examiner—Alan Cariaso

[57] ABSTRACT

A portable luminescent lighting system that includes a housing member and a first case half. The housing member has a top wall, a bottom wall and a pair of long side walls with a pair of lateral cross supports coupled therebetween. The top and bottom wall, each have a plurality of electrical receptacles interiorly coupled thereto for receiving a plurality of bulbs and a plurality of lamps in a parallel orientation. The bulbs and the lamps are each spaced from the pair of lateral cross supports along on complementary sides of the pair of lateral cross supports. A first reflector shield is positioned between the plurality of bulbs and the cross support within the housing member. A second reflector shield is positioned between the plurality of lamps and the cross support within the housing member. Lastly, the first case half has the housing member, with the lamps and bulbs, positioned within. The first case half has the bottom wall with a mounting plate fixedly attached to an exterior side. The mounting plate is capable of coupling with a single mounting bracket that is capable of coupling with a stand for supporting the case above a receiving surface.

10 Claims, 4 Drawing Sheets

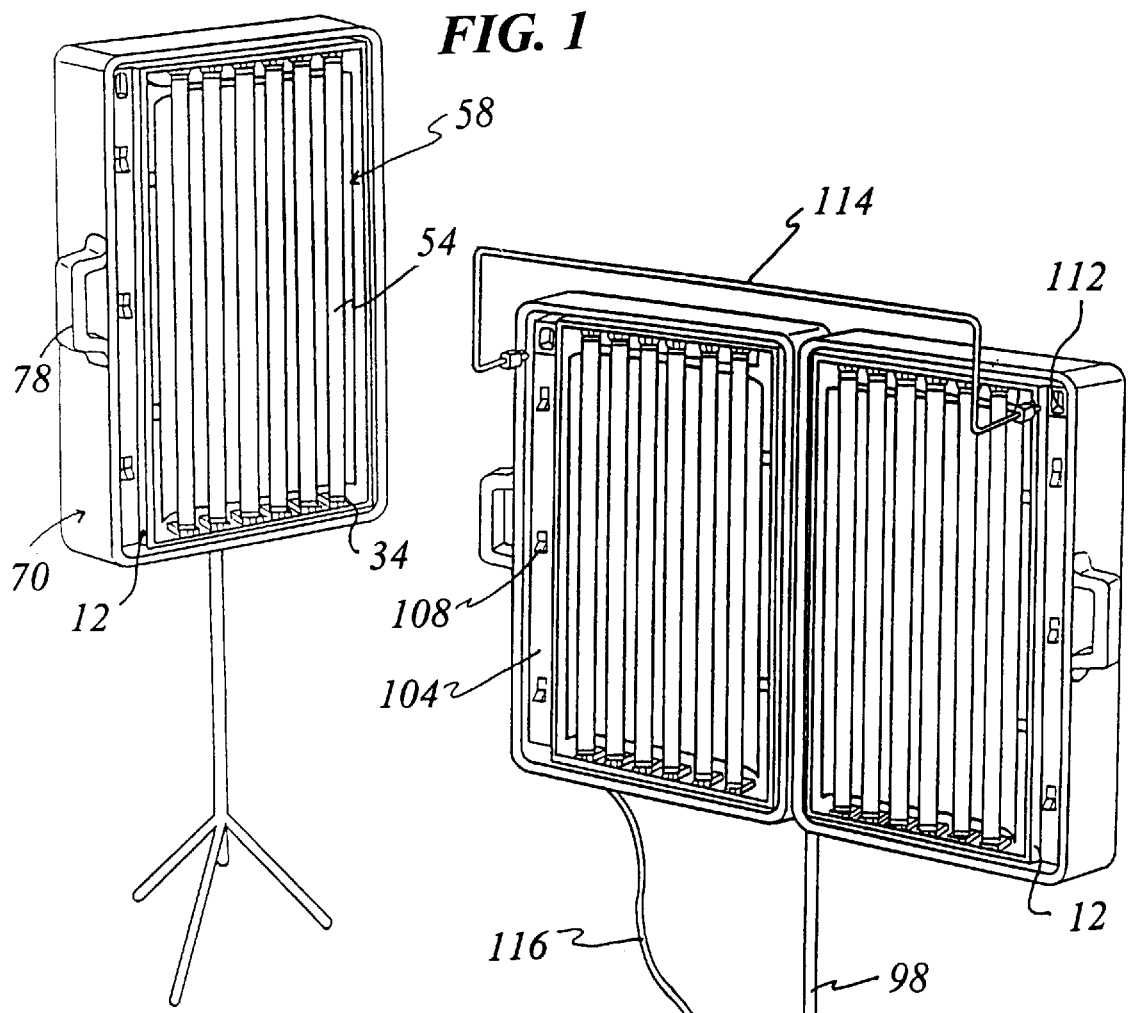
FIG. 1
FIG. 2
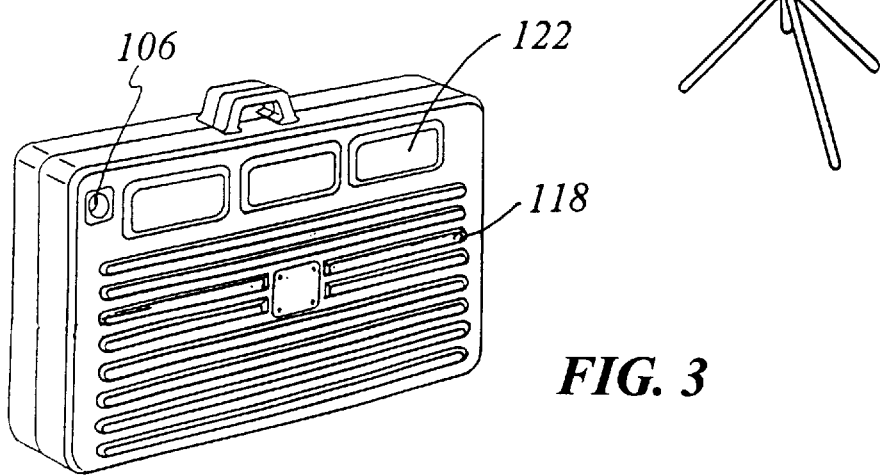
FIG. 3

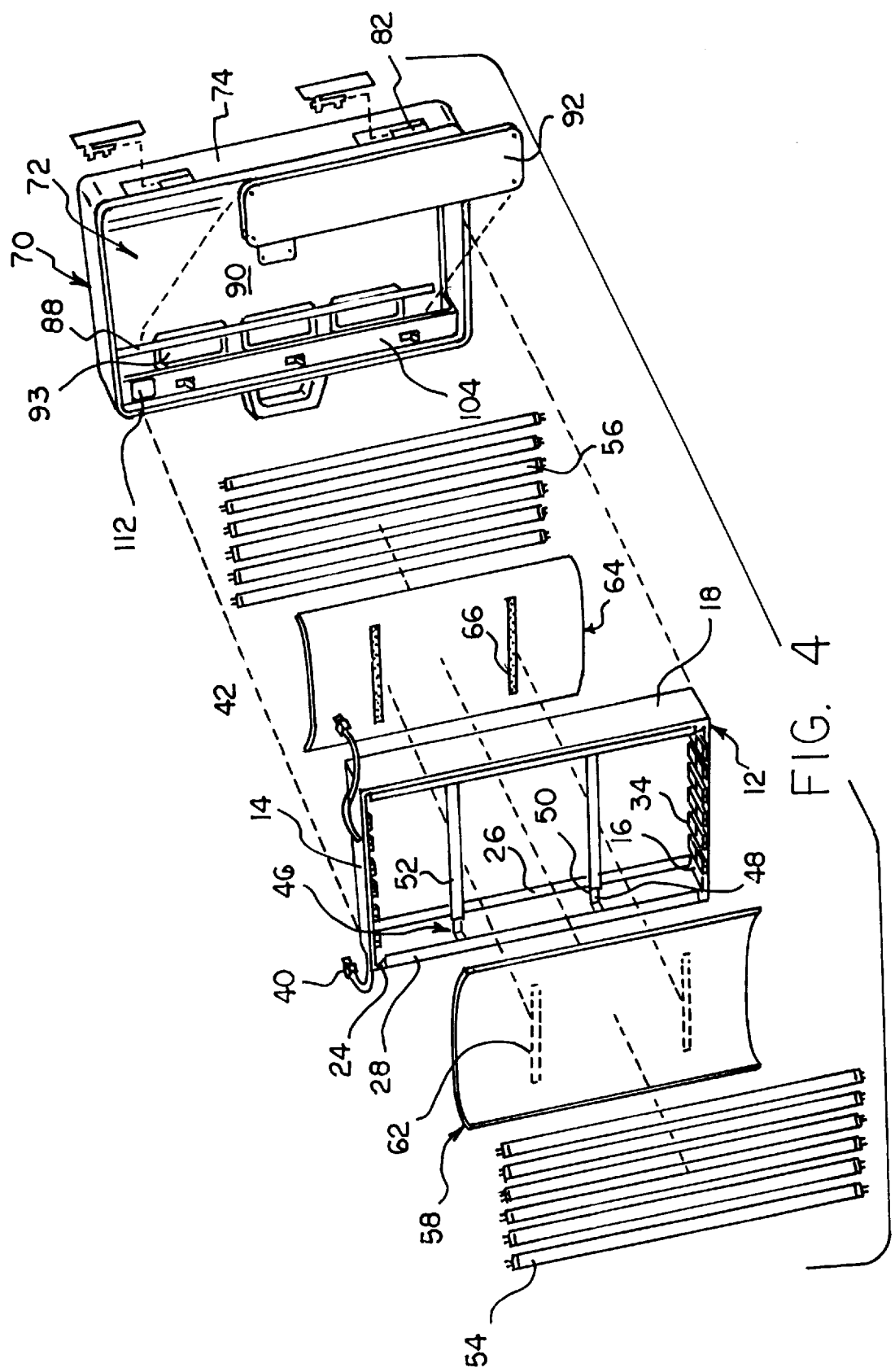

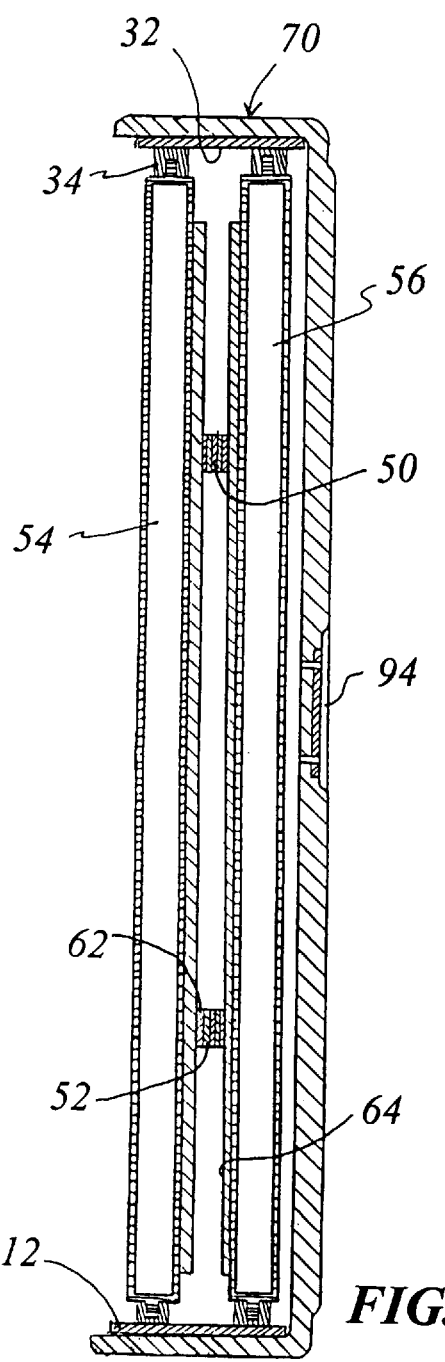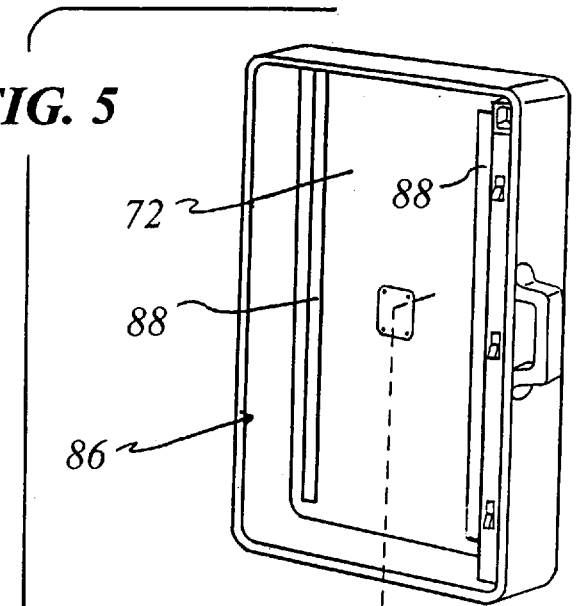

PORTABLE LUMINESCENT LIGHTING SYSTEM

BACKGROUND OF THE INVENTION

1. Field of the Invention

The present invention relates to a portable luminescent lighting system and more particularly pertains to providing a portable lighting system that has dual light sources housed within a case during use and further having a dual A/C power supply for use in the U.S. and international markets.

2. Description of the Prior Art

The use of a portable light system is known in the prior art. More specifically, portable lighting systems heretofore devised and utilized for the purpose of lighting the location being photographed, video taped or filmed are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,253,152 to Yang and So, discloses a lightweight plug-in fluorescent lamp assembly. The lamp assembly will rest upon the existing support grid of a false ceiling or be attached directly to the ceiling in a surface mounted arrangement.

U.S. Pat. No. 5,235,497 to Costa, discloses a luminescent fixture providing directed lighting for television, video, and film production. The luminescent fixture provides sustained illumination by including a plurality of parallel mercury vapor luminescent lamp tubes aligned in close proximity in a common plane bisecting an arcuate concave angle defined by high reflective facing surfaces of a pair of longitudinal reflector panels.

U.S. Pat. No. 5,132,885 to Hocheim and Swirk and assigned to Kino Flo, Inc., discloses a portable fluorescent lighting system for use in location photography, and television and motion picture filming. The system comprises an extremely light weight corrugated plastic panel made into five subpanels by removing two flutes of the corrugation out to provide for hinging. At least one elongated florescent light source is placed on the center subpanel and the other four subpanels are used to control the direction of or limit the output of the fluorescent light as well as act as an enclosure box.

U.S. Pat. No. 5,088,015 to Baggio and Burrows and assigned to Woodhead Industries, Inc., discloses a portable fluorescent lamp fixture for use in coupling with other similar fixtures in a series. The portable fluorescent lamp fixture includes an elongated center channel extending substantially the entire length of the fixture and disposed intermediate a pair of fluorescent lamps for providing a high strength, rugged structure.

U.S. Pat. No. 5,012,396 to Costa discloses a method of apparatus for illuminating television studio and video tape production facilities and method of generating a light source suitable for television studios or video production facilities with high speed florescent lighting devices.

U.S. Pat. No. 4,814,958 to Hsieh discloses a straight type fluorescent lamp device with light reflecting plates. The lamp device has reflecting plates, its body is made by direct extrusion, and it can be cut into any desired length to match with straight-type fluorescent tubes of any length specification and tube holders.

U.S. Pat. No. 4,782,428 to Lowell, Calamai, Doll marks Pronputhsri and Seligman, discloses a collapsible fluorescent light for photography to provide a balance to fluorescent ceiling lights.

U.S. Pat. No. 4,669,033 to Lee and assigned to Specuflex, Inc., discloses an adjustable optical reflector for a fluorescent fixture. The adjustable specular reflector is adapted for use in existing fluorescent lighting fixtures including a plurality of facets extending longitudinally and hingedly joined together.

Lastly, U.S. Pat. No. 3,852,582 to Lowell, discloses a lighting arrangement for photographic work. This is a compact lighting arrangement for photographic work.

In this respect, the portable luminescent lighting system according to the present invention substantially departs from the conventional concepts and designs of the prior art, and in so doing provides an apparatus primarily developed for the purpose of providing a portable lighting system that has dual light sources housed within a case during use and further having a dual A/C power supply for use in the U.S. and international markets.

Therefore, it can be appreciated that there exists a continuing need for a new and improved portable luminescent lighting system which can be used for providing a portable lighting system that has dual light sources housed within a case during use and further having a dual A/C power supply for use in the U.S. and international markets. In this regard, the present invention substantially fulfills this need.

SUMMARY OF THE INVENTION

In view of the foregoing disadvantages inherent in the known types of Portable lighting systems now present in the prior art, the present invention provides an improved portable luminescent lighting system. As such, the general purpose of the present invention, which will be described subsequently in greater detail, is to provide a new and improved portable luminescent lighting system which has all the advantages of the prior art and none of the disadvantages.

To attain this, the present invention essentially comprises a general rectangular housing member. The housing member has a top wall, a bottom wall and a pair of long side walls. Each long side wall has a first end edge and a second end edge for allowing the housing member to have a pair of first end edges and a pair of second end edges. The top and bottom wall each have an interior side with a plurality of electrical receptacles coupled thereto. The top wall has a pair of female connecting plugs extending outwardly. A pair of lateral cross supports are attached between the pair of long side walls. One of the pair of lateral cross supports is spaced from the top wall. The other of the pair of lateral cross supports is spaced from the bottom wall. Each of the pair of cross supports has a first face and a second face, and each face has a pile-type fastener attached. Included are a plurality of elongated bulbs. The bulbs are mounted within the housing between the pair of first end edges and coupled with complementary receptacles of the top and bottom wall. Also, included are a plurality of elongated lamps. The lamps are mounted within the housing between the second end edges and coupling with complementary receptacles of the top and bottom wall. A first reflector shield has a pair of lateral pile-type fastener strips attached. The lateral fastener strips are for coupling with the pile-type fastener of the first face of each of the pair of cross supports. The first reflector shield is positioned between the plurality of elongated bulbs and the cross support within the housing member. A second reflector shield has a pair of lateral pile-type fastener strips attached. The lateral fastener strips of the second reflector is for coupling with the pile-type fastener of the second face of each of the pair of cross supports. The second reflector shield is positioned between the plurality of elongated lamps and the cross support within the housing member. Lastly, a first case half has a bottom wall with a pair of long side walls and a pair of short side walls interconnected. One of the pair of long side walls has a handle attached. Another of the pair of long side walls has a pair of release hinges coupled thereto for releasably engaging a second case half. The first case half is capable of having the housing member, with the lamps and bulbs positioned within the housing member, being releasably coupled with an interior side of the bottom wall. The bottom wall has an exterior side with a mounting plate fixedly attached. The mounting plate is capable of coupling with a single mounting bracket. The single mount bracket couples with a stand for allowing the stand to support the case with the housing member above a receiving surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable luminescent lighting system which has all the advantages of the prior art portable lighting systems and none of the disadvantages.

It is another object of the present invention to provide a new and improved portable luminescent lighting system which may be easily and efficiently manufactured and marketed.

It is a further object of the present invention to provide a new and improved portable luminescent lighting system which is of a durable and reliable construction.

An even further object of the present invention is to provide a new and improved portable luminescent lighting system which is susceptible of a low cost of manufacture with regard to both materials and labor, and which accordingly is then susceptible of low prices of sale to the consuming public, thereby making such portable luminescent lighting system economically available to the buying public.

Still yet another object of the present invention is to provide a new and improved portable luminescent lighting system which provides in the apparatuses and methods of the prior art some of the advantages thereof, while simultaneously overcoming some of the disadvantages normally associated therewith.

Still another object of the present invention is to providing a portable lighting system that has dual light sources housed within a case during use and further having a dual A/C power supply for use in the U.S. and international markets.

Lastly, it is an object of the present invention to provide a new and improved portable luminescent lighting system that includes a housing member and a first case half. The housing member has a top wall, a bottom wall and a pair of long side walls with a pair of lateral cross supports coupled therebetween. The top and bottom wall each have a plurality of electrical receptacles interiorly coupled thereto for receiving a plurality of bulbs, and a plurality of lamps in a parallel orientation. The bulbs and the lamps are each spaced from the pair of lateral cross supports along on complementary sides of the pair of lateral cross supports. A first reflector shield is positioned between the plurality of bulbs and the cross support within the housing member. A second reflector shield is positioned between the plurality of lamps and the cross support within the housing member. Finally, the first case half has the housing member, with the lamps and bulbs, positioned within. The first case half has the bottom wall with a mounting plate fixedly attached to an exterior side. The mounting plate is capable of coupling with a single mounting bracket that is capable of coupling with a stand for supporting the case above a receiving surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the portable luminescent lighting system constructed in accordance with the principles of the present invention.

FIG. 2 is an isometric view of the dual case and light housing member of the preferred embodiment of the present invention.

FIG. 3 is an isometric view of the dual case in a closed orientation.

FIG. 4 is and exploded view of the single case lighting system of the present invention.

FIG. 5 is an exploded view of the housing member and case in an operable orientation.

FIG. 6 is a cross-sectional view of the housing member, case, bulbs and lamps taken along line 6—6 of FIG. 8.

Similar reference characters refer to similar parts throughout the several views of the drawings.

DESCRIPTION OF THE PREFERRED EMBODIMENT

Figure 8:
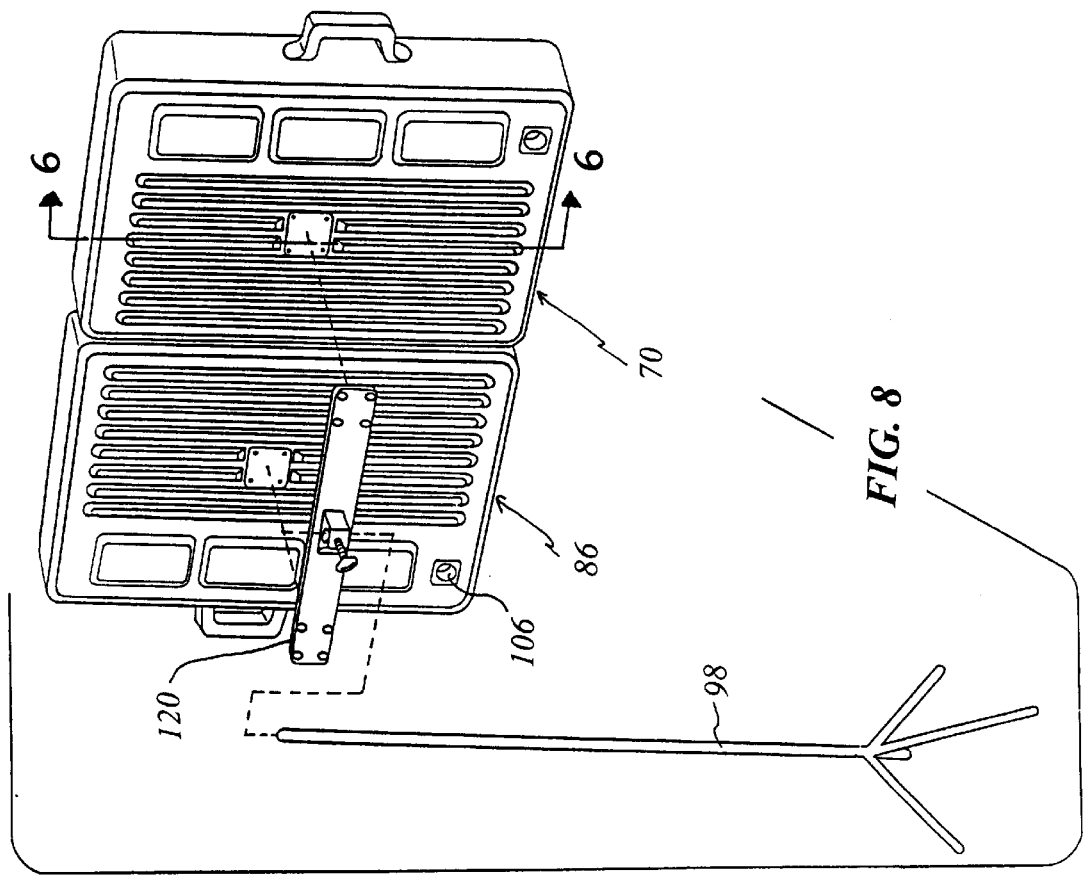
FIG. 8 is a rear view of the dual case showing the operable components of the double mounting bracket.

With reference now to the drawings, and in particular to FIG. 1 thereof, a new and improved portable luminescent lighting system embodying the principles and concepts of the present invention and generally designated by the reference numeral 10 will be described.

The present invention, the new and improved portable luminescent lighting system, is comprised of a plurality of components. Such components in their broadest context include a housing member, lamps, bulbs, a case, a mounting mechanism and a stand. Such components are individually configured and correlated with respect to each other so as to attain the desired objective.

More specifically, it will be noted that the present invention portable luminescent lighting system has a general rectangular housing member 12. The housing member has a top wall 14, a bottom wall 16 and a pair of long side walls 18 between the top and bottom wall. Each long side wall has a first end edge 24 and a second end edge 26, as shown in FIG. 5. The first end edge and the second end edge of each of the pair of long side walls allows the housing member to have a pair of first end edges 24 and a pair of second end edges 26. As, shown in FIG. 4, each of the first end edges of the pair of end edges has a pile-type fastener strip 28. The pile-type fastener strip extends over about 90 percent of the length of the first end edges of one of the pair of long side walls. Although the second pair of ended edges is not shown in a planar view, they have pile-type fastener strips along their length.

Also, the top wall 14 and bottom wall 16 each have an interior side 30 and 32. The interior side, of the top wall and the bottom wall, has a plurality of electrical receptacles 34 coupled in parallel sets, as shown in FIGS. 4 and 6. The receptacles are aligned along the top wall and the bottom wall so as to allow one set to face in the direction of the first end edges, and another set to face in the direction of the second end edges. The top wall has a pair of female connecting plugs 40 and 42 extending outwardly therefrom. One of the female connecting plugs 40 is in electrical communication with the receptacles facing the first end edges. Another of the female connecting plugs 42 is in electrical communication with the receptacles facing the second end edges.

Additionally, a pair of lateral cross supports 46, as shown in FIG. 4, are attached between the pair of long side walls 18. One of the pair of lateral cross supports is spaced from the top wall. The other of the pair of lateral cross supports is spaced from the bottom wall. Each of the lateral cross supports add structural strength to the housing member. Each of the pair of cross supports has a first face 48 and a second face 50. As seen in FIG. 4, each face has a pile-type fastener 52 attached.

A plurality of elongated bulbs 54 are provided. The bulbs, as shown in FIG. 4 are tungsten lamps. The tungsten lamps will provide tungsten color to the subject or area being video taped or photographed. The plurality of elongated bulbs are mounted within the housing, as shown in FIG. 1, between the pair of first end edges. The plurality of elongated bulbs couple with complementary receptacles 34 of the top and bottom wall of the housing member.

A plurality of elongated lamps 56 are included. The lamps of FIG. 4 are daylight lamps. The daylight lamps are mounted within the housing between the second end edges 26. The daylight lamps are coupled with complementary receptacles 34 of the top and bottom wall. The lamps and bulbs are placed in opposite sets of the plurality of the electrical receptacles.

Prior to placing the bulbs into the housing member, a first reflector shield 58 is coupled with the first face of the pair of lateral cross supports. The first reflector shield has a pair of lateral pile-type fastener strips 62 attached. As shown in FIG. 6, the lateral pile-type fastener strips of the first reflector couple with the pile-type fastener 52 of the first face 48 of each of the pair of cross supports. The first reflector shield is positioned between the plurality of elongated bulbs and the cross support within the housing member. The first reflector shield increases the lighting output while reducing heat absorption.

Prior to placing the lamps into the housing a second reflector shield 64 is coupled with the second face of the pair lateral cross supports. The second reflector shield has a pair of lateral pile-type fastener strips 66 attached. As shown in FIG. 6, the lateral pile-type fastener strips of the second reflector shield couple with the pile-type fastener 52 of the second face 50 of each of the pair of cross supports. The second reflector shield is positioned between the plurality of elongated lamps and the cross support within the housing member. The second reflector shield increases the lighting output while reducing heat absorption.

The housing member, with the bulbs and lamps, is structured for placement into a first case half 70. The first case half has a bottom wall 72 with a pair of long side walls 74, and a pair of short side walls 76. The pair of long side walls and the pair of short side walls are interconnected to each other and the bottom wall. The first case half is a rigid plastic that has a high melting threshold. One of the pair of long side walls has a handle 78 attached. Another of the pair of long side walls having a pair of female release hinges 82. The female release hinges allow the first case half to be releasably coupled to a second case half 86, as shown in FIG. 2.

Figure 7:
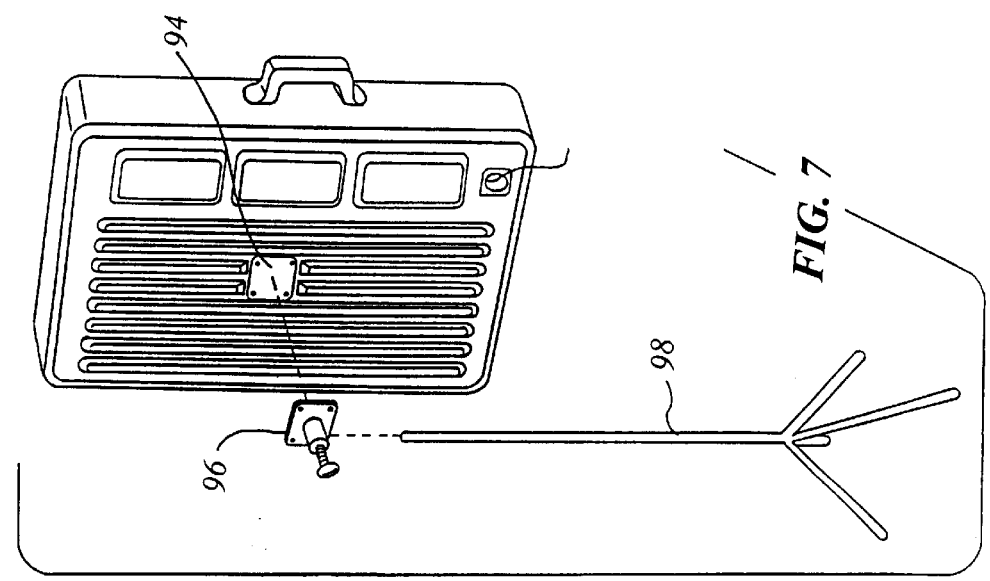
FIG. 7 is a rear view of the single case member showing the operable components of the single mounting bracket.

The first case half 70, as shown in FIG. 1, has the housing member, with the lamps and bulbs, positioned within. The bottom wall has a pair of elongated pile-type fastener strips 88 fixedly attached to the interior side 90. The bottom wall has a ballast cover plate 92 to cover the plurality of ballast 93 mounted within the first case half. The housing member is releasably coupled with the interior side of the bottom wall by way of the pile-type fastener strips 28. The pair of second end edges are coupled to the elongated pile-type fastener strips 88. The bottom wall has an exterior side, as shown in FIGS. 7 and 8. A mounting plate 94 is fixedly attached to the exterior side. The mounting plate is capable of coupling with a single mounting bracket 96. As seen in FIG. 7, the single mount bracket couples with a stand 98 and allows the stand to support the first case half, with the housing member, above a receiving surface.

Lastly, as stated above the first case half can be coupled to a second case half 86. The second case half is a mirror image of the first case half. The second case half, as shown in FIGS. 2 and 5 receive an identical housing member 12. The housing member of the second case half receives the identical plurality of lamps and bulbs. The second case half has a handle 98 and a pair of male release hinges 102 for engaging the female release hinges 82 of the first case half.

Furthermore, the first case half and second case half each have a control panel 104 the is spaced from the ballast cover plate 92 of each case half. The control panel is coupled to the long side wall of the respective case half. Each control panel of each case half is in electrical communication with an exterior male socket 106 of each case half and the ballast. The male socket of each case half is shown in FIG. 8. Each control panel of each case half has a pair of switches 108 and an interior male receiving socket 112, as shown in FIG. 2. One of each of the female connecting plugs, of the housing member and positioned within one of the case halves, may be plugged into the male receiving socket for causing electrical communication between the control panel, the ballast and the housing member. When the first case half and the second case half are coupled to be adjacent one another, a wide light source is formed, as shown in FIG. 2. The wide light source is placed into electrical communication with a jumper cable 114. The jumper cable, as shown in FIG. 2, allows the user to use a single power cable 116 to carry electricity to both case halves.

Each case half has a plurality of ribs 118 projecting from the exterior side. The ribs provide strength to the bottom wall and aid in preventing the lamps and bulbs inside from being broken or crushed. The mounting plate of each case half is capable of coupling with a double bracket mount 120 when the first case half and the second case half are coupled. The double bracket mount will couple with a stand for allowing the stand to support the first and second case with the housing member above a receiving surface. The bottom wall of each case half has a plurality of ballast recesses 122 for accommodating the electrical circuitry of the lighting system. Finally, as depicted in FIG. 3, the coupled case halves can be placed in a juxtaposed position to look like a suitcase. In this position, when coupled to form a suitcase, carrying and storing of the housing member with the lamps and bulbs is possible.

The present invention portable luminescent lighting system for providing directed lighting for television, video and film production easy to assemble. The fixtures and all hardware, ballast's cables, tubes, mounts etc. are all self contained. When using the present invention the user needs only open the suite case and plug into a power supply. The male receiving sockets along the exterior of the case halves is capable of handling both 110 and 220 volt for U.S. and international use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable luminescent lighting system for providing directed lighting from television, video and film production comprising in combination:

a general rectangular housing member having a top wall, a bottom wall and a pair of long side walls therebetween, each long side wall having a first end edge and a second end edge for allowing the housing member to have a pair of first end edges and a pair of second end edges, the top and bottom wall each having an interior side with a plurality of electrical receptacles coupled thereto, the top wall having a pair of female connecting plugs extending outwardly therefrom;

a pair of lateral cross supports being attached between the pair of long side walls, one of the pair of lateral cross supports being spaced from the top wall, the other of the pair of lateral cross supports being spaced from the bottom wall, each of the pair of cross supports having a first face and a second face and each face having a pile-type fastener attached thereto;

a plurality of elongated bulbs mounted within the housing between the pair of first end edges and coupling with complementary receptacles of the top and bottom wall;

a plurality of elongated lamps mounted within the housing between the second end edges and coupling with complementary receptacles of the top and bottom wall;

a first reflector shield having a pair of lateral pile-type fastener strips attached for coupling with the pile-type fastener of the first face of each of the pair of cross supports, the first reflector shield being positioned between the plurality of elongated bulbs and the cross support within the housing member;

a second reflector shield having a pair of lateral pile-type fastener strips attached for coupling with the pile-type fastener of the second face of each of the pair of cross supports, the second reflector shield being positioned between the plurality of elongated lamps and the cross support within the housing member; and a first case half having a bottom wall with a pair of long side walls and a pair of short side walls interconnected thereto, one of the pair of long side walls having a handle attached, another of the pair of long side walls having a pair of release hinges coupled thereto for releasably engaging a second case half, the first case half capable of having the housing member, with the lamps and bulbs, positioned within, the housing member being releasably coupled with an interior side of the bottom wall, the bottom wall having an exterior side with a mounting plate fixedly attached thereto, the mounting plate capable of coupling with a single mounting bracket, the single mount bracket coupling with a stand for allowing the stand to support the case with the housing member above a receiving surface.

2. A portable luminescent lighting system comprising in combination:

a housing member having a top wall, a bottom wall and a pair of long side walls with a pair of lateral cross supports coupled therebetween, the top and bottom wall each having a plurality of electrical receptacles interiorly coupled thereto for receiving a plurality of bulbs and a plurality of lamps in a parallel orientation, the bulbs and the lamps each being spaced from the pair of lateral cross supports along on complementary sides of the pair of lateral cross supports;

a first reflector shield being positioned between the plurality of bulbs and the cross support within the housing member;

a second reflector shield being positioned between the plurality of lamps and the cross support within the housing member; and a first case half having the housing member, with the lamps and bulbs, positioned within, the first case half having the bottom wall with a mounting plate fixedly attached to an exterior side thereof, the mounting plate capable of coupling with a single mounting bracket capable of coupling with a stand for supporting the case above a receiving surface.

3. The portable luminescent lighting system as set forth in claim 2, wherein each long side wall of the housing member having a first end edge and a second end edge for allowing the housing member to have a pair of first end edges and a pair of second end edges.

4. The portable luminescent lighting system as set forth in claim 2, wherein the top wall of the housing member having a pair of female connecting plugs extending outwardly.

5. The portable luminescent lighting system as set forth in claim 2, wherein one of the pair of lateral cross supports being spaced from the top wall of the housing, the other of the pair of lateral cross supports being spaced from the bottom wall of the housing, each of the pair of cross supports having a first face and a second face and each face having a pile-type fastener attached thereto.

6. The portable luminescent lighting system as set forth in claim 3, wherein the bulbs being coupled between the pair of first end edges and coupling with complementary receptacles of the top and bottom wall, and the lamps being coupled between the second end edges and coupling with complementary receptacles of the top and bottom wall.

7. The portable luminescent lighting system as set forth in claim 5, wherein the first and second reflector shield each having a pair of lateral pile-type fastener strips attached, the pile-type fastener strips of the first shield for coupling with the pile-type fastener of the first face of each of the pair of cross supports, and the pile-type fastener strips of the second reflector shield for coupling with the pile-type fastener of the second face of each of the pair of cross supports.

8. The portable luminescent lighting system as set forth in claim 2, wherein the first case half having a bottom wall with a pair of long side walls and a pair of short side walls interconnected thereto.

9. The portable luminescent lighting system as set forth in claim 8, wherein one of the pair of long side walls of the first case half having a handle attached, another of the pair of long side walls of the first case half having a pair of release hinges coupled thereto for releasably engaging a second case half, and the housing member being releasably coupled with an interior side of the bottom wall for positioning of the lamps and bulbs within the first case half.

10. A portable luminescent lighting system comprising in combination:

a first case half and a second case half with each case half having a housing member mounted therein, each housing member having a bottom wall with a plurality ballast recesses and an exterior male socket;

the housing member of each case half having a top wall, a bottom wall and a pair of long side walls therebetween, the top and bottom wall each having an interior side with a plurality of electrical receptacles coupled thereto, the housing member of each case half having a pair of lateral cross supports coupled between the pair of long side walls, the top wall of the housing member having a pair of female connecting plugs extending therefrom;

a plurality of elongated bulbs mounted within the housing member of each case half, and spaced from the pair of lateral cross supports;

a plurality of elongated lamps mounted within the housing member of each case half and spaced from the pair of lateral cross supports;

a first reflector shield being positioned between the plurality of elongated bulbs and the cross support within the housing member of each case half;

a second reflector shield being positioned between the plurality of elongated lamps and the cross support within the housing member of each case half; and the first and second case halves each having a control panel coupled to a long side wall thereof and in electrical communication with the exterior male socket of each case half, each control panel of each case half having a pair of switches and an interior male receiving socket, one of each of the female connecting plugs of the housing member being positionable within the male receiving socket for causing electrical communication between the control panel and the housing member, each case half having a bottom wall with a mounting plate being capable of coupling with a double bracket mount, the double bracket mount coupling with a stand for allowing the stand to support the first and second case halves with the housing member above a receiving surface.

* * * * *